United States Patent [19]

Andermo

[11] 4,177,463
[45] Dec. 4, 1979

[54] METHOD AND DEVICE FOR MEASURING THE VELOCITY OF AN OBJECT RELATIVE TO A REFERENCE

[75] Inventor: Ingvar Andermo, Täby, Sweden

[73] Assignee: Stiftelsen Institutet for Mikrovågsteknik vid Tekniska Hogskolan I Stockholm, Stockholm, Sweden

[21] Appl. No.: 862,609

[22] Filed: Dec. 20, 1977

Related U.S. Application Data

[63] Continuation of Ser. No. 688,334, May 20, 1976, abandoned, which is a continuation of Ser. No. 473,943, May 28, 1974, abandoned.

[30] Foreign Application Priority Data

Jun. 1, 1973 [SE] Sweden .............................. 7307801

[51] Int. Cl.$^2$ .............................................. G01S 9/44
[52] U.S. Cl. ........................................................ 343/8
[58] Field of Search ............................................ 343/8

[56] References Cited

U.S. PATENT DOCUMENTS

| 3,147,477 | 9/1964 | Dickey | 343/8 |
| 4,041,293 | 8/1977 | Kihlberg | 343/8 X |
| 4,068,207 | 1/1978 | Andermo et al. | 343/8 X |

Primary Examiner—T.H. Tubbesing
Attorney, Agent, or Firm—Flynn & Frishauf

[57] ABSTRACT

A method and apparatus for measuring the velocity of an object relative to a reference wherein the object has receivers thereon which scan a spatial function which originates from the reference. A signal is developed in each receiver, the value of which is dependent upon the position of the scanning range of the receiver relative to the reference. Signal values from a number of scanning ranges at various positions relative to the object are stored either simultaneously or cyclically at a first instant and then are compared with corresponding signal values obtained at a later time. The displacement of the spatial function relative to the object between the two scanning instants is determined and the velocity of the object is calculated from the magnitude of the displacement and the time elapsing between the scanning instants.

19 Claims, 25 Drawing Figures

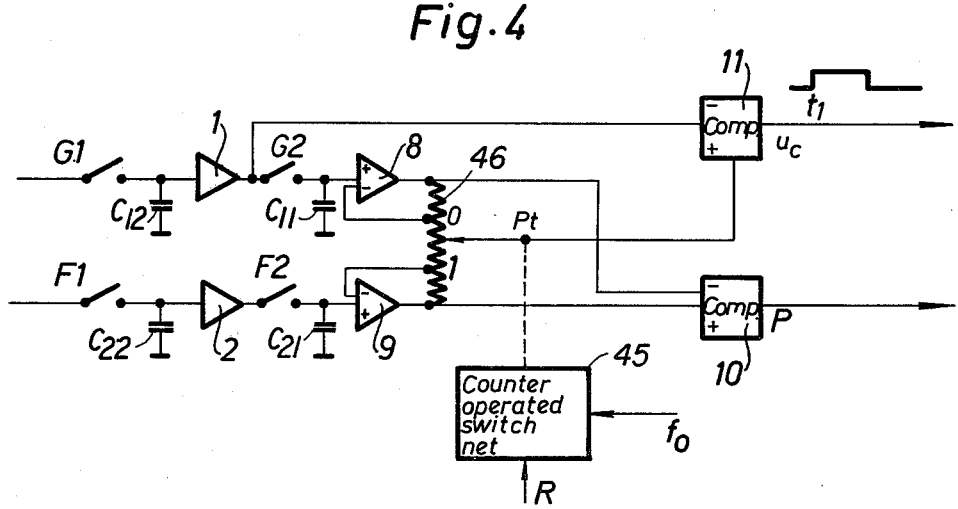
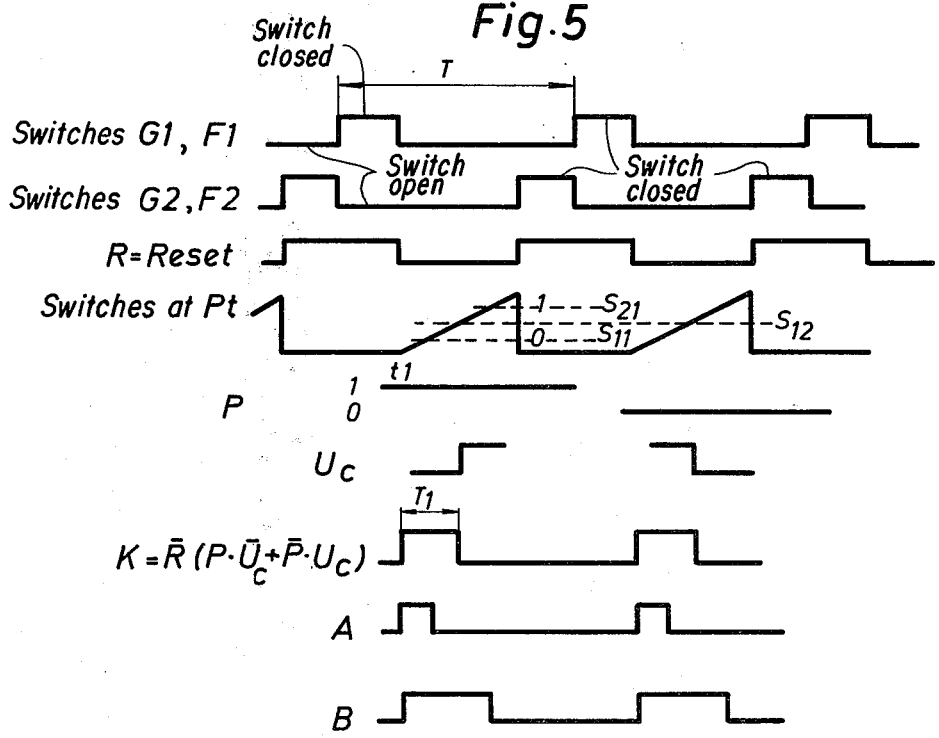

$$X = (U_C \cdot \bar{K} \cdot P + U_C \cdot K \cdot \bar{P}) \, \bar{A1} \cdot B$$
$$Y = (\bar{U}_C \cdot K \cdot P + \bar{U}_C \cdot \bar{K} \cdot \bar{P}) \, \bar{A1} \cdot B$$

$$M = (U_C \cdot \bar{Q} \cdot P + U_C \cdot Q \cdot \bar{P}) \, \bar{A1} \cdot B$$
$$N = (\bar{U}_C \cdot Q \cdot P + \bar{U}_C \cdot \bar{Q} \cdot \bar{P}) \, \bar{A1} \cdot B$$

METHOD AND DEVICE FOR MEASURING THE VELOCITY OF AN OBJECT RELATIVE TO A REFERENCE

This is a continuation of application Ser. No. 688,334, filed May 20, 1976, now abandoned, which is a continuation of Ser. No. 473,943, filed May 28, 1974, now abandoned.

This invention relates to a method of measuring the velocity of an object in relation to a reference by means of receivers on the object that scan a space function originating from the reference, a signal being developed in each receiver, the signal value of which depends upon the position of the scanning range of the receiver relative to the reference; and a device for carrying out the method.

According to a previously known method, such velocities can be measured by measuring the time lag between the signals from the two scanning means. This prior method only has a limited capacity of measuring very low velocities as the time lag approaches infinity when the velocity approaches zero. According to the present invention it will be possible to measure velocities down to zero, including limited negative velocities, without reversing the direction of operation.

SUMMARY OF THE INVENTION

This objective is realized according to the invention mainly in that signal values from a number of scanning ranges at different positions relative to the object are stored simultaneously or cyclically at a first occasion and are then compared with the corresponding signal values obtained on a later occasion, the displacement of the space function relative to the object between the two scanning occasions being determined and the velocity being calculated from the size of the displacement and the time elapsing between the scanning occasions.

The device according to the invention is characterized mainly by signal values from a number of scanning ranges at different positions relative to the object being stored simultaneously or cyclically in a memory at a first occasion, means being provided for comparing these signal values with the corresponding values obtained on a scanning occasion, means being arranged for determining the displacement of the space function relative to the object between the two scanning occasions and for generating a velocity signal that depends upon the displacement and on the time elapsing between the scanning occasions.

BRIEF DESCRIPTION OF THE DRAWINGS

FIG. 4 shows another circuit for velocity measurement, FIG. 5 shows a pulse and voltage diagram of the circuit in FIG. 4.

DETAILED DESCRIPTION OF ILLUSTRATED EMBODIMENT

Figure 1:
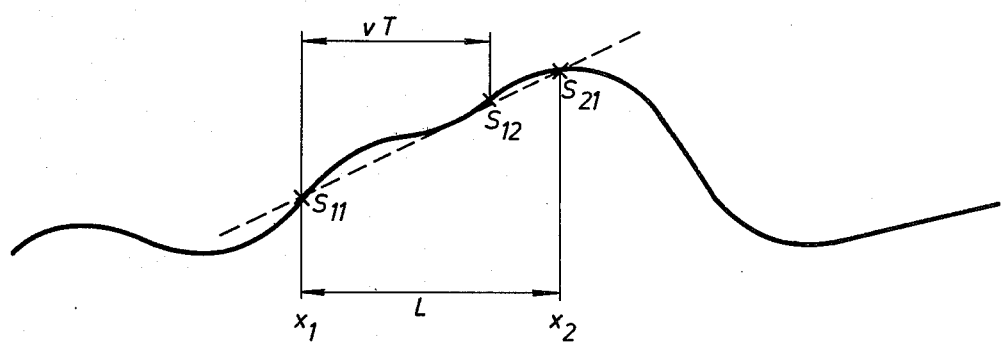
FIG. 1 shows an example of a space function f(x)

FIG. 1 shows an example of the space function f(x) that is scanned by the scanning devices and utilized in velocity measurement. Two scanning devices are assumed to be situated at the distance L from each other. On a first occasion $t_1$ the signal values $S_{11}$ and $S_{21}$ are scanned by the two scanning devices. On a later occasion $t_2$, spaced from $t_1$ by the time T, the signal values are rescanned, scanning device 1 yielding the value $S_{12}$.

$$S_{11} = f(x_1)$$

$$S_{12} = f(x_1 + vT)$$

$$S_{21} = f(x_2) = f(x_1 + L)$$

If the distance L is short as compared with the shortest wavelength in the f(x) spectrum, values of f(x) between points $x_1$ and $x_2$ may be interpolated from $S_{11}$ and $S_{21}$ (possibly also from $S_{22}$). In the simplest design it is assumed that f(x) is a straight line between the values $S_{11}$ and $S_{21}$ (i.e., interpolation of the first order). In a more sophisticated design attention is also paid to $S_{10}$, $S_{20}$ and $S_{12}$, $S_{22}$. We shall here deal only with a system involving interpolation of the first order. The assumption that f(x) forms a straight line between points $f(x_1)$ and $f(x_2)$ leads to the relation $$S_{12} - S_{11} = (S_{21} - S_{11}) \cdot \frac{vT}{L}$$

so that $$v = \frac{L}{T} \cdot \frac{S_{12} - S_{11}}{S_{21} - S_{11}}$$

We have thus obtained an expression for velocity v that comprises only known or measurable finite quantities. This offers a possibility of velocity measurement that works even at zero velocity. It can easily be seen from FIG. 1 that in the present case $S_{11}=S_{12}$. Should the movement be in a direction opposite to that considered above, $S_{12}-S_{11}$ will be negative relative to $S_{21}-S_{11}$.

Figure 2:
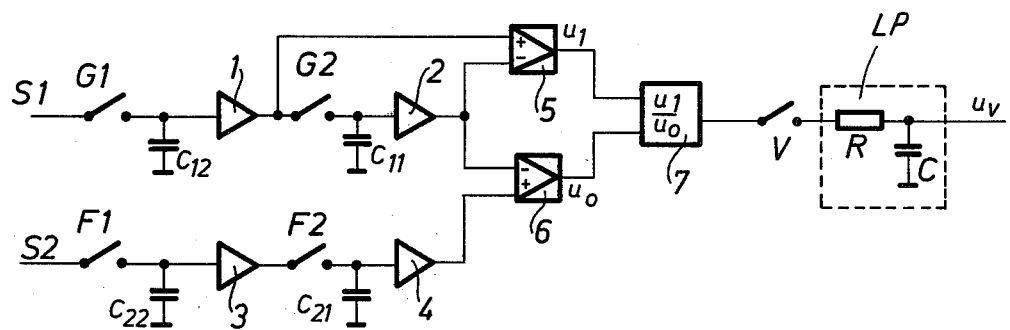
FIG. 2 shows a block diagram of an electronic circuit for velocity measurement according to the invention.
Figure 3:
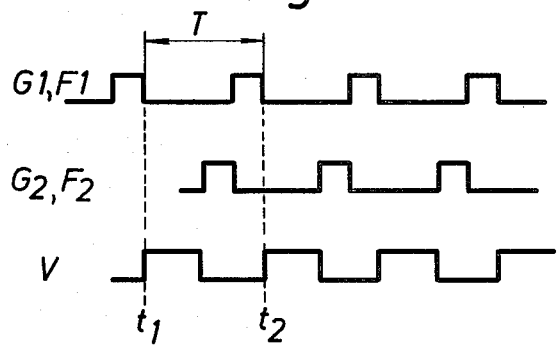
FIG. 3 shows a pulse diagram for the circuit in FIG. 2.

FIG. 2 shows electronic circuitry for automatic calculation of the velocity in accordance with the relation above. FIG. 3 shows a timing diagram for the connection and disconnection of the switches in FIG. 2. According to these figures the capacitors $C_{12}$ and $C_{22}$ will store the signal values $S_{11}$ and $S_{21}$, respectively, at the time $t_1$. Then switches G1 and F1 are opened. After a period of time=T/2 the switches G2 and F2 are connected, thus transferring $S_{11}$ and $S_{21}$ to $C_{11}$ and $C_{21}$, respectively. Then G1 and F1 are again connected while switches G2 and F2 are opened, causing $S_{12}$ and $S_{22}$ to become stored in the capacitors $C_{12}$ and $C_{22}$, respectively.

The units 1, 2, 3, and 4 are buffer amplifiers with the amplification factor 1, which only serve to enable the voltages to be transferred without any load on the capacitors concerned.

The output voltage of the differential amplifier 6 corresponds to $S_{21}-S_{11}$, the output voltage of the differential amplifier 5 corresponds to $S_{12}-S_{11}$. The unit 7 carries out the division $(S_{12}-S_{11})/(S_{21}-S_{11})$, and this value is proportional to the velocity v while the switches G1, G2, F1, and F2 are disconnected. The switch V is connected during these periods of time, a voltage $u_v$ corresponding to the velocity v thereby being provided at the output of the low-pass filter LP. It is the function of low pass filter LP to store $u_v$ while the switch V is disconnected and to filter off variations that may possibly occur, owing to disturbances affecting signals $S_1$ and $S_2$.

FIG. 4 shows one design of an electronic circuit, in which the division is done by a variable voltage divider (potentiometer 46) having an arm $P_t$ that is controlled for instance by an electronic calculator. The voltage divider according to the illustration is connected in such a way that the voltage corresponding to $S_{11}$ is developed across ¼ of the voltage divider as measured from its upper end and the voltage corresponding to $S_{21}$ is developed across ¾ of the voltage divider. The switches G1, G2, F1 and F2, the buffer amplifiers 1 and 2 and the capacitors $C_{11}$, $C_{12}$, $C_{21}$ and $C_{22}$ have the same function as corresponding elements in FIG. 2. Amplifiers 8 and 9 are operational amplifiers with respective capacitors $C_{11}$ and and $C_{21}$. The signal $f_0$ is a clock signal and signal R is a reset signal. The counter operated switch net 45 is a counter circuit controlling the effective position of arm $P_t$ of the potentiometer 46.

FIG. 5 shows a timing diagram of switch functions, the time variation of the voltage divider, and the pulses and levels obtainable at various places in the system. The spacing ratio of the voltage divider is controlled by a calculator which, as the Reset pulse is discontinued, begins to step down the potentiometer arm concurrently with a frequency $f_0$, which is a multiple of the frequency 1/T, e.g., 256·1/T. At the time T/8 after starting (i.e., after 32 steps) the potentiometer output voltage passes the value $U_{11}$, at the time 3T/8 after starting (i.e., after 96 steps) the said output voltage passes the value $U_{21}$, to finally reach a value corresponding to $$U_{21} + \frac{U_{21} - U_{11}}{2}.$$

The comparator 11 continuously senses the difference between $U_{12}$ and the above-mentioned linearly varying output voltage of the voltage divider. As this output voltage passes the value $U_{12}$ the comparator inverts its output voltage in one direction or the other, depending upon the polarity of the voltage $U_{21}-U_{11}$. By combining this pulse with a signal P from comparator 10 that indicates the polarity of the voltage $U_{21}-U_{11}$, a positive pulse K (shown in FIG. 5) is obtained. Pulse K is formed in accordance with the logical expression $K=\overline{R}(P\cdot\overline{U_c}+\overline{P}\cdot U_c)$ given in FIG. 5. Pulse R is illustrated also in FIG. 5. Pulse K lasts from the point of time $t_1$ at which the potentiometer sweep starts until the point of time when the potentiometer voltage=$U_{12}$. Pulse signal A is high during the time in which the potentiometer arm $P_t$ passes from the output of amplifier 8 to point 0 on the potentiometer 46. Pulse signal B is high during the time in which the potentiometer arm $P_t$ passes from the output of amplifier 8 to point 1 on the potentiometer 46. By subtracting from this pulse another pulse A (FIG. 5) whose duration corresponds to the duration of the pulse K at zero velocity, a new pulse A·K is obtained the duration $T_v$ of which corresponds to the share in $v_0$ of the velocity in question. $v_0$ is the velocity that makes the relation $$\frac{S_{12} - S_{11}}{S_{21} - S_{11}} = 1$$

i.e.

$$v_o = \frac{L}{T}.$$

Applying the relations illustrated in FIG. 5 we get $$T_v = \frac{v}{v_o} \cdot \frac{T}{4}$$

$$v = v_o \cdot 4 \frac{T_v}{T} = 4 \frac{L \cdot T_v}{T^2}.$$

By letting the pulse A·K gate out $f_0$ pulses there will be on an average $$f_v = f_o \cdot \frac{T_v}{T} \text{ pulses/s}$$

$$= f_o \cdot \frac{v}{v_o} \cdot \frac{T}{4} \cdot \frac{1}{T} = \frac{256}{T} \cdot v \cdot \frac{T}{L} \cdot \frac{1}{4}$$

$$= v \cdot \frac{64}{L}$$

i.e., $f_v$ will be proportional to the velocity independent of the value of T.

If the velocity is reduced, approaching zero, and then begins to increase in the opposite direction then the duration $T_1$ of the pulse K will decrease towards the value T/8 in FIGS. 4 and 5, corresponding to zero velocity, and will subsequently assume values less than T/8 in the case of negative velocities. In this way the duration of K will follow the velocity down to $v=-v_0/2$. Similarly, K can follow positive velocities up to a value that is so far above $v_0$ as is determined by Pt's share between the output and negative input of the operational amplifier 9. Dimensioning according to FIGS. 4 and 5 we get $v_{max} = v_0 \cdot 1.5$.

The accuracy of the system just described is good when the time T is about the same as the length of time required by the object to travel the distance of the base line L, i.e., when $v \approx v_0$. At deviations of any significance from that value a source of error occurs, which is dependent on the relation between L and the spatial frequency spectrum comprised by f(x). This makes it advisable to introduce a control of $f_0$ so that $v_0 = v$ under normal conditions. At velocities below a certain low velocity $v_{min}$, which is determined by limitations of a practical nature associated with the time T, $v_0$ is allowed to remain at $v_{min}$, and velocities below $v_{min}$ are allowed to depress the duration $T_1$ of K as described above.

Figure 6:
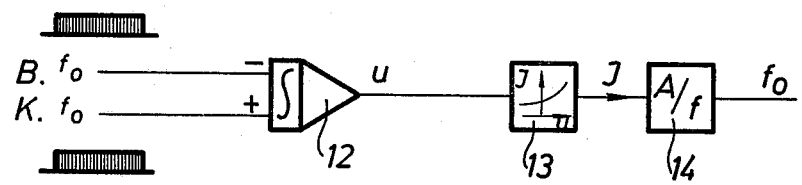
FIG. 6 shows a circuit for controlling the pilot frequency $f_0$ in FIG. 4.

FIG. 6 illustrates an example of a circuit that controls $f_0$ so that $v_0 \approx v$. The circuit comprises an integrator 12 to the positive input of which pulses $K \cdot f_0$ are fed while pulses $B \cdot f_0$ are fed to its negative input, a compensating circuit 13, and an analog frequency changer 14. The duration of the pulse B, shown in FIG. 5, corresponds to that of K at $v = v_0$.

When K is shorter than B, corresponding to $v < v_0$, the negative input to integrator 12 will receive more current than its positive input and the output voltage of the integrator will diminish, which will cause a reduction of $f_0$ and hence of $v_0$. This process will continue until the duration of the pulse K equals that of B, i.e., $v = v_0$. The compensating circuit 13 is a non-linear circuit whose main function is to adjust the time constant in the change of $f_0$ to the velocity $v_0$. A suitable function for this circuit is $$I = I_0 \cdot e^{u/u_0}$$

where $I_0$ and $u_0$ are eligible constants. This function together with such a design of the pulses $f_0$ that their absolute length will be constant independent of the frequency causes the time constant in the regulation of $f_0$ to become inversely proportional to $v_0$, which implies that the time constant can be expressed as a distance constant, i.e., an error in $f_0$ builds up into 1/e of the original value on a constant distance independent of the velocity. This has been found to be an optimum dimensioning. Element 14 provides a signal of frequency proportional to the input current fed thereto from element 13.

The function just mentioned automatically implies that $f_0$ cannot fall below a certain value $f_{0\ min}$ that is determined by $$I_{min} = I_0 \cdot e^{-U_B/u_0}$$

where $U_B$ denotes the maximum negative voltage of the integrator 12, generally = the negative supply voltage. At velocities below the value corresponding to $f_{0\ min}$ K will thus diminish without $f_0$ being affected.

Figure 7:
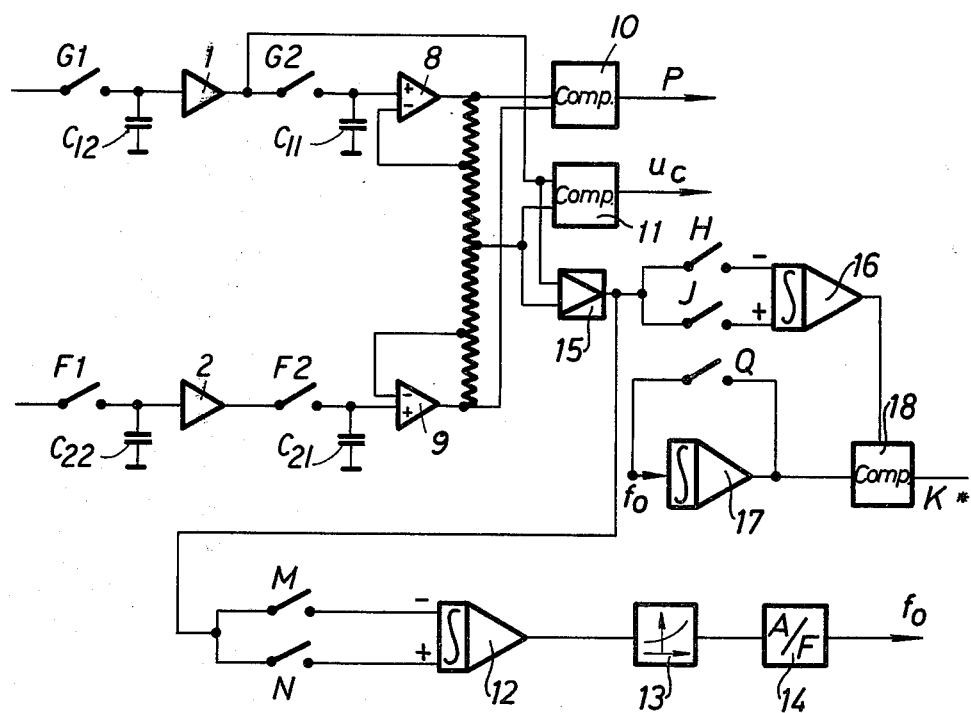
FIG. 7 shows still another circuit for velocity measurement.
Figure 8:
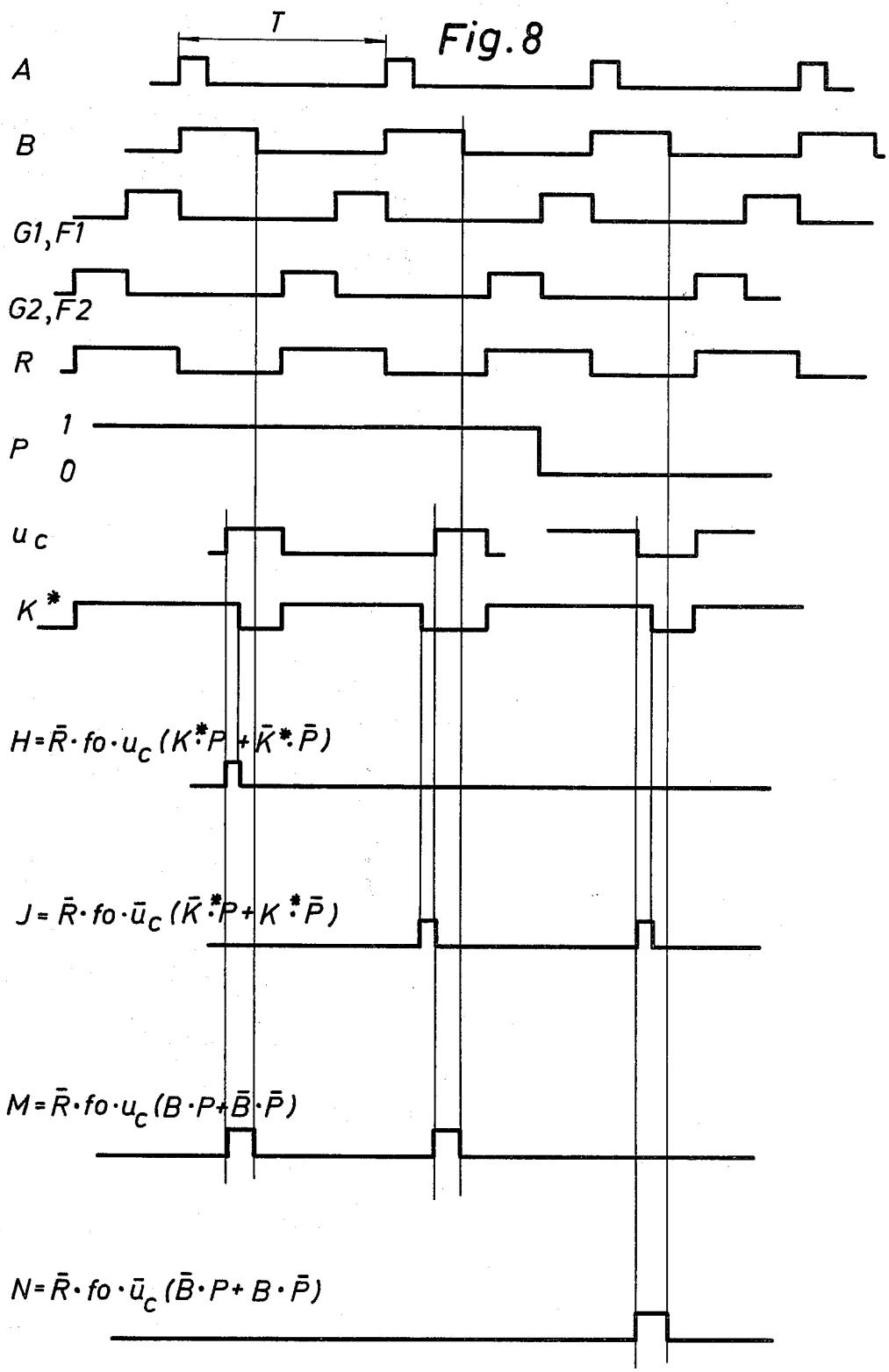
FIG. 8 shows pulse diagrams of the circuit in FIG. 7.

A problem associated with the network according to FIGS. 4 and 5 will occur in cases when $u_{21} - u_{11} \approx 0$. Here the inversion of the comparator 10 will occur at any time except during scanning. FIGS. 7 and 8 suggest one way of solving the problem. According to this solution a slave pulse K* is generated, which replaces the pulse K in FIG. 5. The comparator 10 still remains but is supplemented by a differential amplifier 15, two switches H and J, an integrator 16, another integrator 17 with a zero-adjusting switch Q, and another comparator 18. The differential amplifier 15 provides finite amplification and thus provides a drive signal to the integrator 16 via switches H and J, which are dependent on the amplitude of the signal $u_{12} - u_{11}$. The closure times of the switches H and J are controlled by P, $u_c$, K* in such a manner that if K* is too short in relation to the velocity, the output voltage of the integrator 16 increases, whereas too big a value of K* causes that voltage to diminish.

The pulse K* is controlled by output voltages from the integrators 17 and 16 in the following way. The integrator 17 is set at zero by the switch Q until the point of time $t_1$. Its output voltage then begins to increase concurrently with the incoming pulses $f_0$. As its voltage passes the value held by the integrator 16 the comparator 18 change over, and the rear edge of the pulse K is formed. The $f_0$ pulses are of constant length irrespective of the frequency, making the inclination of the output voltage of the integrator 17 proportional to the frequency. For this reason a certain value of the output voltage of the integrator 16 always implies the same relative position of the rear edge of the pulse K* in the pulse diagram irrespective of the T value.

In the network shown in FIG. 7, K* is affected only slightly or not at all when the differential voltages across the potentiometer are small but remains at the value already attained. At big differential voltage values the amplifier 15 may well be overmodulated; there will then be an input current to the integrator 16 that is proportional to the error.

The control of $f_0$ in FIG. 7 is not based on the length of K*. Instead two switches M and N are coupled to the output circuit of the amplifier 15, M being connected to the negative input and N to the positive input of the integrator 12. The switching program for M and N is similar to that of H and J but is designed to make $f_0$ approach a value that will make $v_0 = v$. Here as well, weak signals over the potentiometer Pt will affect the integrator only in proportion to its amplitude whereas strong signals that overmodulate the amplifier 15 will set up signals to the integrator that are proportional to the error.

Figure 9:
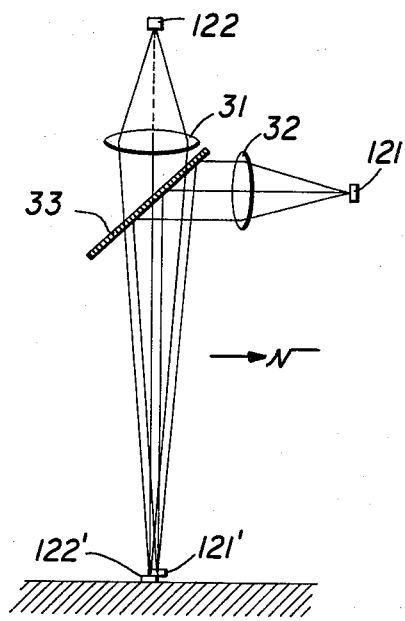
FIG. 9 shows an optical sensor.
Figure 10:
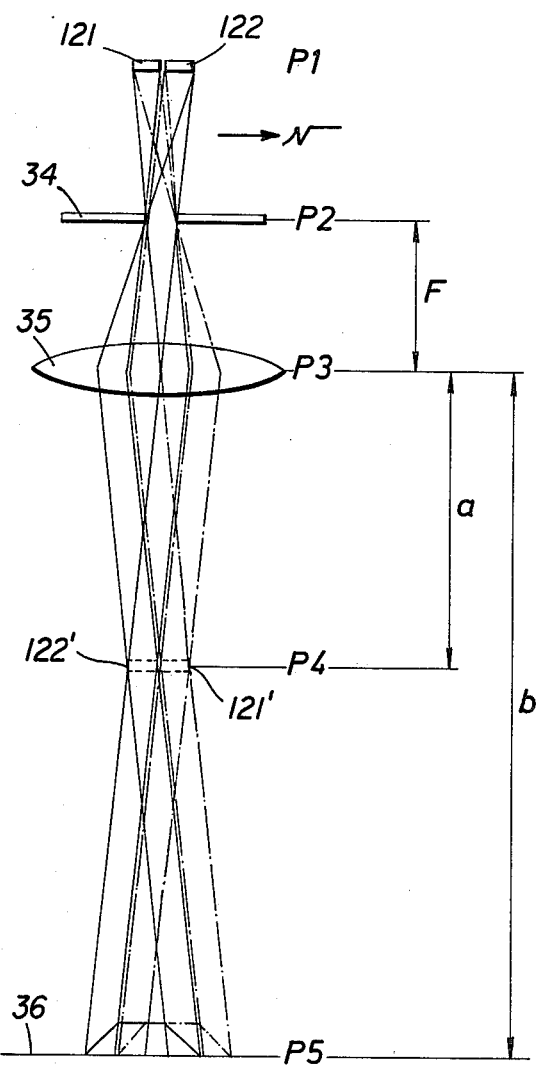
FIG. 10 shows another optical sensor according to the invention.

It is important for the signal processing as described that the signals from the two adjacent sensors have a certain correlation at zero time delay. If there were no zero correlation between the two signals the straight line approximation of the function illustrated by a dotted line in FIG. 1 would be meaningless. At a high correlation factor (zero delay) the straight line approximation will be good and the voltage distribution over the potentiometer 46 in FIG. 4 will represent the signal between the points $x_1$ and $x_2$ (FIG. 1) with a reasonably good accuracy. The correlation factor between the two signals at zero delay is proportional to the overlapping of the area of the signal object which are sensed by the two sensor elements (receiving elements) if the signal source has an unlimited frequency spectrum. For optical sensors the signal source generally has an unlimited frequency spectrum. FIG. 9 shows how overlapping sensing areas on the object can be formed by means of a semi-transparent mirror and two optical systems, one for each sensor element. FIG. 10 shows another way of obtaining overlapping sensing areas on the object. The optical system here forms virtual images 121' and 122' of the sensor elements 121 and 122, respectively, in a plane P4 which is separated from the object plane P5. As can be seen in FIG. 10, the areas in the object plane P5 which are sensed by the two sensor elements 121 and 122 will then be overlapping. In FIG. 9, photodiodes 121,122 cooperate with respective lenses 32,31. Another design, utilizing one system of lenses 35, for both channels, is illustrated in FIG. 10. Here the photo diodes 121′,122′ are situated beside each other at level P1. At level P3 there is a lens 35 that reproduces the photo diodes beside each other 121′,122′ at level P4. At the focal distance F of the lens, between P1 and P3, a diaphragm 34 sets the beams of the two channels parallel after their passage through the lens 35. This implies that the centers of the areas from which each photo diode 121,122 picks up signals are at a constnt distance from each other irrespective of the distance to the lens 35. As can be seen from FIG. 10, however, the two scanning ranges will overlap when the object 36 being measured is beyond the focusing plane P4. Hence the desired overlapping of the scanning ranges is achieved by focusing the image at another distance a from the lens than the distance b of the object.

Figure 11:
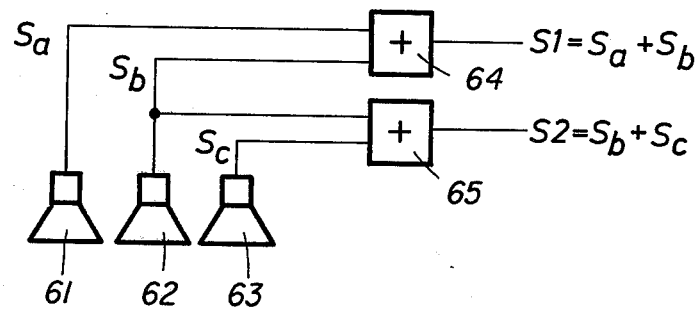
FIG. 11 shows a microwave sensor.

A third method of achieving scanning ranges that overlap is illustrated in FIG. 11. This method is exemplified by a microwave sensor comprising three antennas Sa, Sb and Sc with respective receiving elements 61–63, the signal S1 being produced by adding the signals in adder 64 from the left-hand Sa and center Sb antennas whereas S2 is produced by addition in adder 65 of the signals from the center Sb and right-hand Sc antennas. According to S1 will originate from a range that overlaps the range producing S2.

Figure 12:
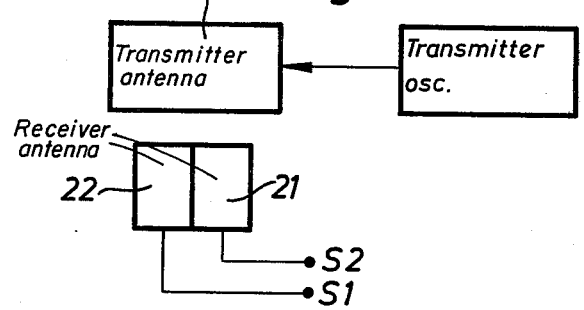
FIG. 12 shows the antennas of an acoustic speedometer according to the invention.

Instead of making the scanning ranges of the sensors overlap, it may be useful in certain cases to influence the spatial frequency spectrum of the function f(x) in such a way that the scanning ranges need not overlap. One such method is illustrated in FIG. 12 where a separate transmitter antenna 20 is used, the transmitter antenna 20 extenting in the direction of travel as much as, or more than, the two receiver antennas 21 and 22 together. The spatial frequency spectrum of f(x) will then be determined by the extension of the transmitter antenna 20 and will be limited mainly to cover frequencies up to a value corresponding to a wavelength that equals the length of the transmitter antenna 20 in the direction of travel.

Figure 13:
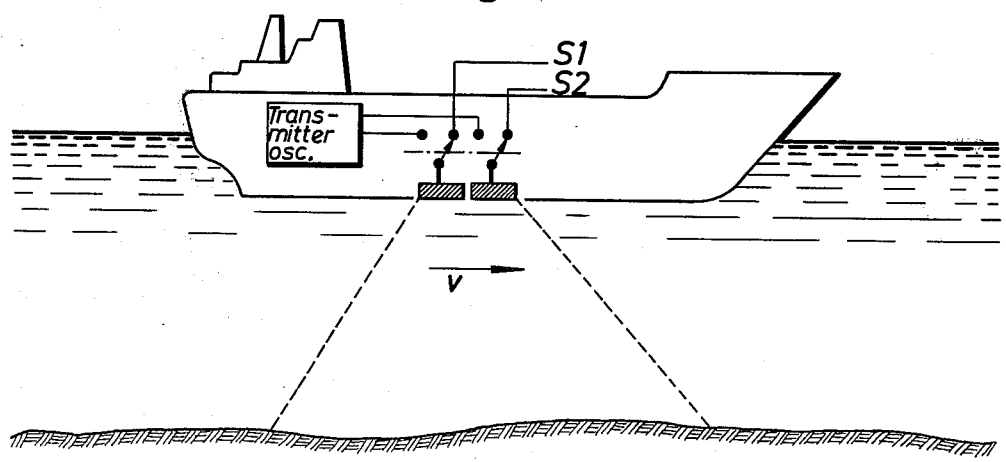
FIG. 13 shows one design of the antennas of an acoustic sensor as fitted at the bottom of a ship.
Figure 14:
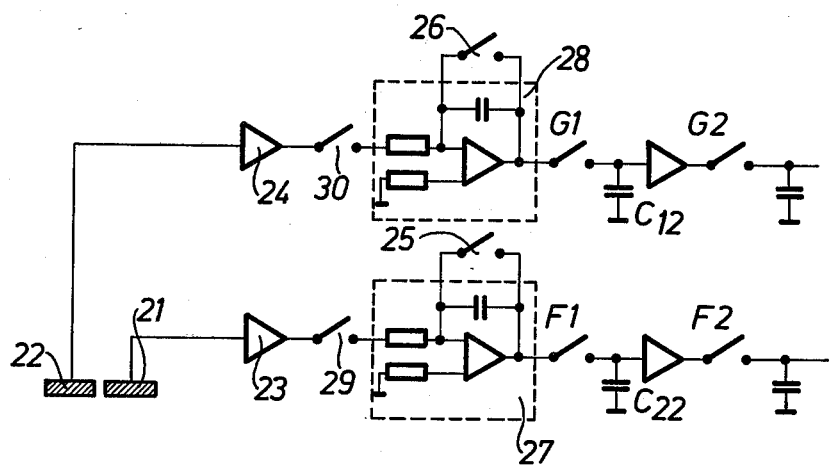
FIG. 14 shows a block diagram of a filter device.

FIG. 13 shows a device that is applicable for instance to an acoustic log for the purpose of achieving materially the same effect as that of the device according to FIG. 12. This design comprises two sensor elements that may either be connected to the transmitting oscillator, in which case they transmit a sound wave synchronously, or they may be connected to one receiving channel each. As the sound requires a certain time to pass from the ship to the ocean floor and back, the same element can be used here for both transmission and reception purposes. Since the two elements are joined, in principle, during transmission but are used separately during reception, the desired limitation of the frequency spectrum can be achieved. It is further possible to produce overlapping scanning ranges by means of a circuit that forms the mean signal value while the scanning range is moving a certain distance across the spatial function. FIG. 14 shows how much a mean signal valve is arrived at in the case of two scanning ranges that are connected at the same time with the speedometer device. The signals from the signal receivers 21 and 22 may also contain interference generated by internal or external sources. To suppress the effect of such sources of interference some kind of filtration should be applied. The normal way would be to use frequency filters with a certain band width. This band width has to be sufficient to enable the modulation utilized in velocity measurement to pass through even at the highest practicable velocities. The filters in the two channels should be very nearly identical to prevent the introduction of time-delay differences between the two channels, which would impair the accuracy of the velocity measurement, especially at high velocities.

Figure 15:
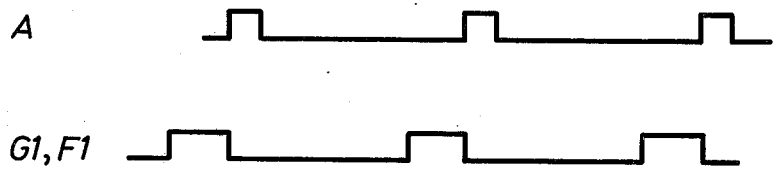
FIG. 15 shows a pulse diagram of the circuit in FIG. 14.

FIG. 14 demonstrates a method of filtering the signals that adapts the band width to the velocity and involves no serious matching problems. Here, each channel contains an integrator 27, 28, which integrates the signals during the periods of time between the sampling instants into the capacitors $C_{22}$ and $C_{12}$, respectively. The switches 25 and 26, respectively, short-circuit the integrators for a short while, immediately following the transfer of the signal values to the memory capacitors $C_{22}$ and $C_{12}$, respectively. When the short-circuiting is discontinued the integrators reassume the integration of the respective signals, a process continuing until the circuits through the switches 25 and 26 are again closed responsive to the pulse A in FIG. 15. Immediately before, the switches G1 and F1 have transferred the integrated signal values to the memory capacitors $C_{12}$ and $C_{22}$, respectively, in accordance with the pulse diagram in FIG. 15. In this way the signal values stored in $C_{22}$ and $C_{12}$ are mean values of the signals entering in the intervals between the sampling instants. At low velocities the sampling frequency is low and the integration is effected during a correspondingly prolonged period of time, at high velocities the integration is carried out during a shorter period of time, which implies that the formation of means signal valves is effected during a shorter time.

Figure 16:
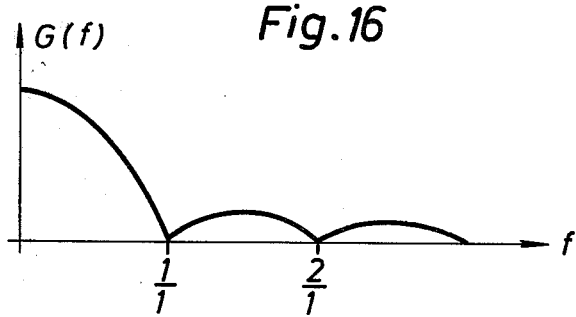
FIG. 16 shows a frequency diagram of the filter in FIG. 14.

FIG. 16 shows the characteristic of the filter in FIG. 14. The filter function corresponds to the formula $$G(f) = \frac{\sin \pi f T}{f T}$$

which implies that the filter characteristic is dependent on the switching period T in such a way as to make the effective band width proportional to the velocity within the velocity range where T is inversely proportional to the velocity (T=L/v).

The integrators 27 and 28 will integrate the signal up to a value that is proportional to the closed-circuit period (7T/8) unless special action is taken. The switches 29 and 30 have been incorporated to suppress this effect. These switches are governed by the frequency $F_0$, the switches being closed during a constant period of time, for instance 2 μs of each period of $f_0$. The over-all time in which the switches 29 and 30 remain closed during the integration process between the closings of the switches 25 and 26, respectively, will then be independent of the duration of T since T is controlled by $f_0$ and alway contains the same number of periods of $f_0$.

Figure 17:
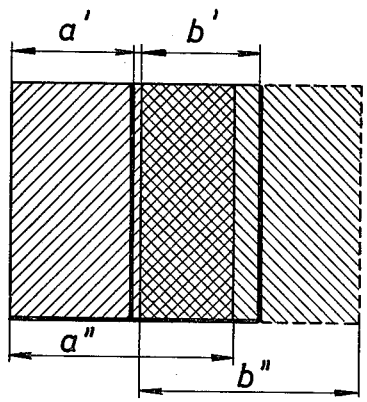
FIG. 17 shows the dependence of the scanning ranges upon the filter in FIG. 14.

The forming of mean signal values carried out by the integrators 27 and 28 also implies that the signal samples utilized in the velocity measurement originate from reception ranges for the sensors that have a greater extent than the geometrical extent of the sensors. This is illustrated in FIG. 17 in which the stationary scanning ranges of the two signal transmitters have a length of a′ and b′, respectively, in the direction of measurement whereas the resulting signal, following the formation of means, originates from scanning ranges having a length of a″ and b″, respectively.

Figure 18:
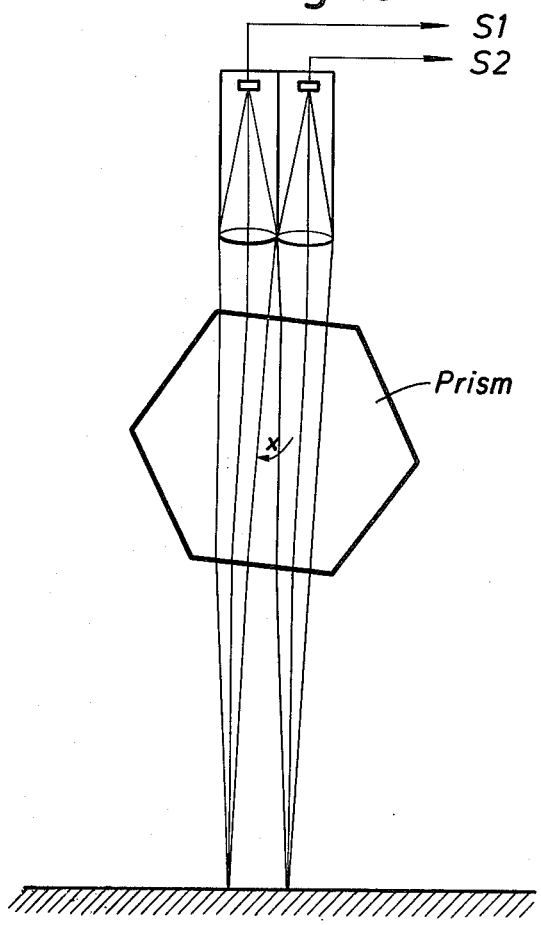
FIG. 18 shows an optical sensor with two movable scanning ranges.
Figure 19:
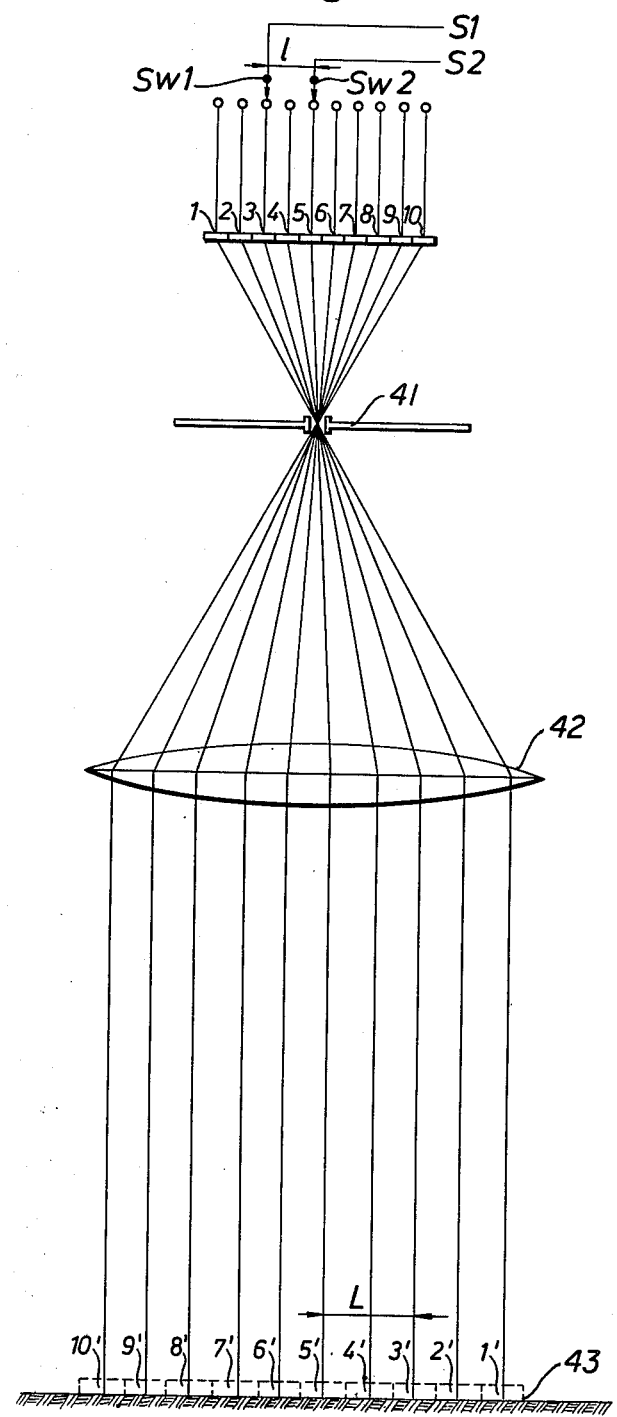
FIG. 19 shows an optical sensor with a number of scanning ranges.
Figure 20:
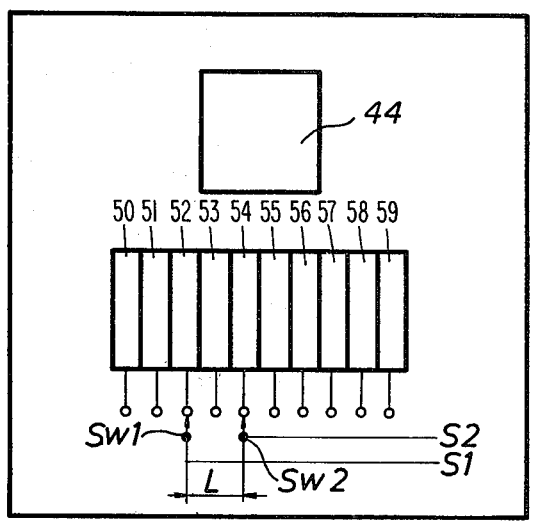
FIGS. 20 and 21 show an acoustic sensor with a number of scanning ranges.

There is thus, owing to the filtration, an equivalent overlapping of the scanning ranges of the signal transmitters, which is advantageous in the signal processing described in connection with FIGS. 2, 4 and 7. According to one design of the invention, zero velocity of the object can be measured by means of two scanning devices provided, in principle, that these move at a known velocity relative to the object. Such movement may be effected in various ways. In an optical sensor, for instance, a rotary right prism may be arranged in the beam according to FIG. 18. When being rotated the prism causes a displacement of the scanning range in the close vicinity of the object at a velocity that depends upon the rotational velocity of the prism. The two photo-electric cells of the sensor generate signals at a time delay that is dependent on the sum of the scanning velocity $v_0$ and the velocity $v$ of the object. Another way of producing a movement of the scanning devices is to build a sensor, comprising a multitude of elements, two signal outputs being fed to switches that switch them from one sensor element to another in such a sequence that a movement of the scanning range is obtained. This method can be used for instance in connection with optical, acoustic and microwave signal transmitters. An optical device of the above-mentioned type is shown in FIG. 19 whereas FIG. 20 illustrates an acoustic sensor with movable receiver zones. In the device according to FIG. 19 a diaphragm 41 is situated between the photo-electric cells and the lens 42 at the focal distance of the lens. This arrangement makes the image distance between the photo-electric cells in the close vicinity of the object 43 independent of the distance to the lens.

Figure 21:
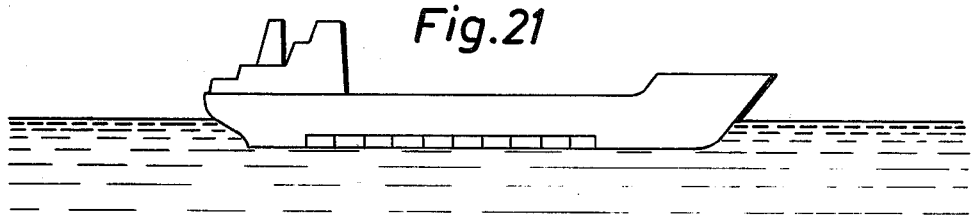

FIG. 20 shows a horizontal projection of an acoustic sensor as mentioned whereas FIG. 21 is a diagrammatic representation of its installation aboard a vessel. The size of the sensor is exaggerated in relation to the size of the ship, the extent of the actual sensor being only a few decimeters whereas the ship's length may be anything up to some 200 m. The acoustic sensor comprises a transmitter element 44 and a number of receiver element ten of which are shown in FIGS. 20 and 21.

In FIGS. 19, 20 and 21 two signals S1 and S2 are tapped by two contact arms Sw1 and Sw2, respectively, which move along the field of the sensors 50-59 at a velocity $v_0$. The distance between the contact arms is given as 1 in the optical sensor and as L in the acoustic sensor. In the optical sensor the photo-electric cells are magnified on to the close vicinity of the object 43 so that the distance 1 here corresponds to a new distance, L. When the velocity of the object $v=0$ the two signals S1 and S2 will have a mutual time delay $\tau_O = L/v_0$, owing to the scanning by the switches Sw1 and Sw2, respectively. When the object moves a time delay occurs that is dependent on the total velocity $$\tau = L/(v+v_0).$$

(For the acoustic sensor the correct formula would actually be $\tau = L/(2v+v_0)$ but for the present purpose the ship's velocity may be defined in such a way that the same formula can be used for both the optical and the acoustic sensor.)

Figure 22:
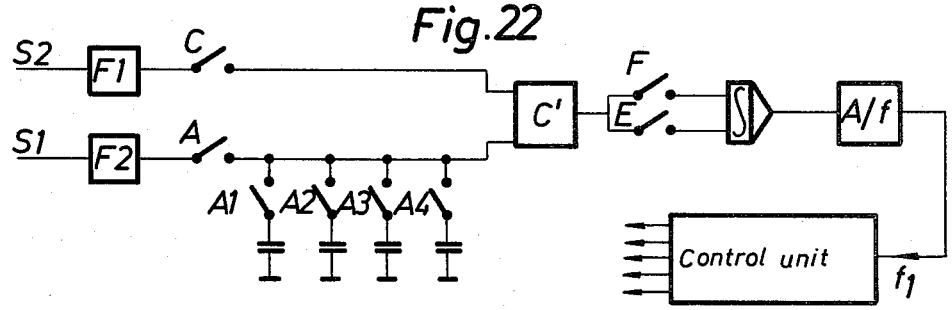
FIG. 22 shows a circuit for measuring the time lag between two signals from sensors according to FIGS. 18, 19 and 20.

The signal processing for determining $v$ may be arranged for instance as in FIG. 22. F1 and F2 are filters that eliminate the sampling effect in the signals from Sw1 and Sw2, respectively, enabling continuous signals to be formed again. The functioning of the circuits, including the switches A, C, A1, A2, A3, A4, E, F, the blocks C, I, A/F, and the Control Unit are described in Swed. Pat. No. 348,055. An output signal consisting of pulses whose frequency is proportional to the velocity is obtained by combining the signal $f_1$ from the circuit according to FIG. 22 with the pilot frequency $f_2$ for the scanning switches of the sensor as the velocity $v$ of the object being mesured is $$v = L\frac{f_1}{k_1} - \frac{f_2}{k_2} = k \cdot f$$

The generation of f from $f_1$ and $f_2$ as above can be effected by means of a number of digital circuits of a known design.

So far the presence of two switches Sw1 and Sw2 and two signals S1 and S2 has been assumed. It is also possible, however, to confine oneself to a single switch arm and a single signal path. This being the case, each scan is compared to the signal values stored in the electronic system since the previous scan. This procedure is equivalent on the whole with the system first described but with the base line L longer than, or equal to, the over-all extent of the signal transmitter.

Figure 23:
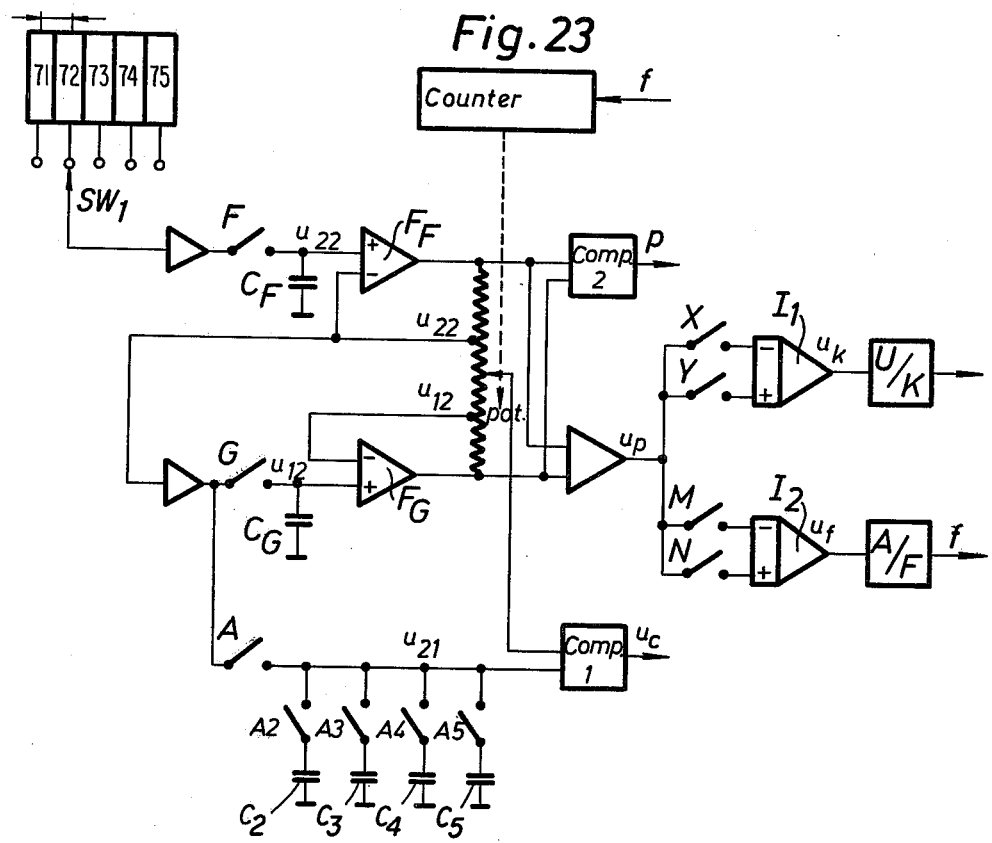
FIG. 23 shows a block diagram of still another design of a speedometer according to the invention.
Figure 24:
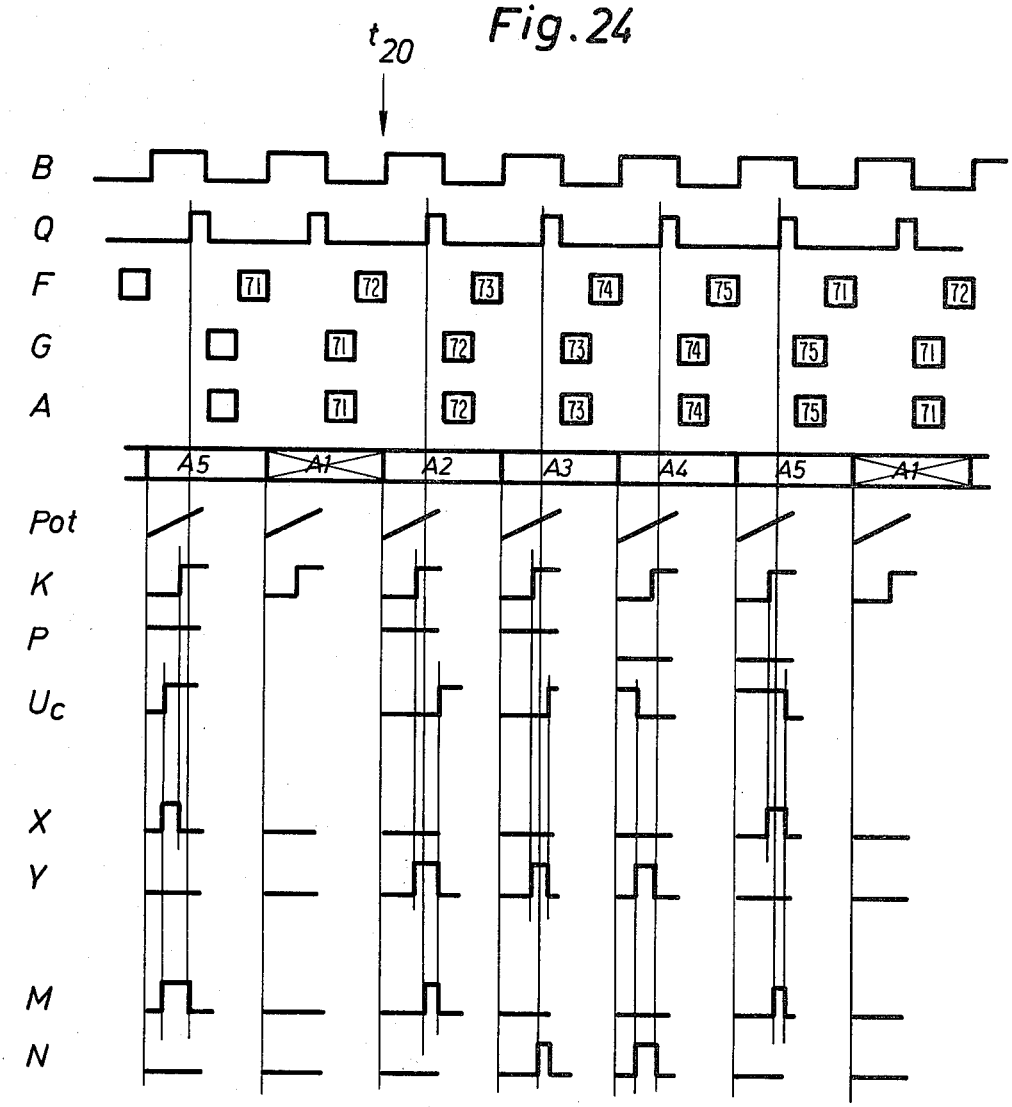
FIG. 24 shows a pulse diagram of the circuit in FIG. 23.

FIG. 23 shows an example of a network used in velocity measurement, comprising a five-element sensor comprised of elements 71-75 and a sole signalling line. FIG. 24 shows a timing diagram of control pulses for the switches in the system and also certain voltage functions that are generated in the system. The pulses B and Q, the pulses for controlling the switches F, G, A, A2-A5, and the pulses for controlling the potentiometer (Pot) are all synchronous with the pilot frequency $f_0$. Switches A2-A5 are connected to respective capacitors C2-C5. The voltages P and $U_c$ are dependent on signal values from the sensor and control, over the integrators $I_1$ and $I_2$, the position of the ramp in the voltage K and the pilot frequency f, respectively, to conformity with the velocity of the object being measured. The logic signals P and $U_c$ are combined with other logic signals in the system according to FIG. 24 and the logic expressions in the lower part of FIG. 24 to form pulses X, Y, M and N which control the corresponding input switches of the integrator $I_1$ and $I_2$. The result will be a servo loop for both the pilot frequency f and the position of the positive step in the pulse K. As described herein, the pilot frequency f will then follow the speed at normal velocities. At very low velocities the pilot frequency f will be constant and instead the K-pulse will be adopted to the actual speed as described immediately above. The functioning of the network in FIG. 23 will now be described.

The analysis will be started at the point $t_{20}$ according to the time marking in FIG. 24. The switch F has just opened and the signal value $U_{22}$ from the sensor elements 72 is stored in the capacitor $C_F$. The capacitor $C_G$ stores the signal value $U_{12}$ from the sensor element 71. This value was transferred from $C_F$ when the switch G was closed last. The points of the potentiometer that are connected to the -input of the respective operational amplifiers now have the potentials $U_{12}$ and $U_{22}$, respectively. The extension of the potentiometer beyond these points implies a linear extrapolation of the voltage difference $U_2 - U_1$ in proportion to resistance values of the various parts of the potentiometer since the same current flows through the entire potentiometer set-up. The lower input of Comparator 1 (Comp. 1) now holds the signal value $U_{21}$ of the sensor element 2 since the last round of the scanning sequence along the sensor elements. At $t_{20}$ the potentiometer arm starts its travel from the upper end of the potentiometer. When the voltage in the potentiometer arm reaches $U_{21}$ the output voltage $U_c$ of Comp. 1 becomes inverted and one step is made in $U_c$. This step is in the positive or negative direction depending on the polarity of the voltage $U_{12}-U_{22}$.

The voltage across the entire potentiometer is amplified by an amplifier giving the output voltage $U_p$. The voltage $U_p$ is fed over switches X and Y to the ingtegrator $I_1$ and over switches M and N to the integrator $I_2$. These switches are controlled by pulses which are dependent upon logic levels and pulses in the system according to the following logic expressions indicated at the bottom part of FIG. 24:

$$X = (U_C \cdot \overline{K} \cdot P + U_C \cdot K \cdot \overline{P}) \overline{A1} \cdot B$$

$$Y = (U_C \cdot K \cdot P + \overline{U}_C \cdot \overline{K} \cdot \overline{P}) \overline{A1} \cdot B$$

$$M = (U_C \cdot \overline{Q} \cdot P + U_C \cdot Q \cdot \overline{P}) \overline{A1} \cdot B$$

$$N = (\overline{U}_C \cdot Q \cdot P + \overline{U}_C \cdot \overline{Q} \cdot \overline{P}) \overline{A1} \cdot B$$

Signals X, Y, M and N are pulses which control respective switches. Signals B, Q, F, G, A and A1–A5 are pulses following a fixed program according to FIG. 24, controlled by the pilot frequency f via a known type of logic network (consisting of, for example, frequency divider chain and a number of AND, OR, NAND, and NOR gates). The result will be two servo loops for controlling the K pulse front edge to coincide with the mean position of the $U_C$ pulse edge (positive or negative edge chosen with respect to the polarity of the signal over the potentiometer as indicated by signal P from comparator 2) and for controlling the pilot frequency f to have a value corresponding to the actual speed. In the logic for the switch pulses X, Y, M and N, and A1 signal is included for turning off the switches in the A1 interval (see FIG. 23) because that interval contains a comparison of signals from sensor element 75 and sensor element 71 which does not correspond to the normal comparison of nearby sensor elements which is done in the other four measuring cycles.

The switches M and N on the input side of $I_2$ are controlled by $U_c$, P and a pulse Q. The pulse Q makes a positive step at the time when the potentiometer arm passes the point where the negative input terminal of the amplifier $F_G$ is connected. The pilot frequency f of the system is controlled by the output voltage $U_f$ of the integrator $I_2$ over the analogous frequency changer A/F. The control program for the switches M and N according to FIG. 24 results in the integration of $U_p$ with $I_2$ in such a manner that the pilot frequency endeavors to reach a position so that the step in $U_c$ will occur simultaneously with the positive flank of the pulse Q. This occurs when $U_{12}=U_{21}$, which implies that the sensor has moved by a distance a (= the distance between adjacent elements in the sensor) across the signal pattern in the period of time from the sampling of the signal at the sensor element 1 during one scan until the sampling of the signal at the sensor element 2 during the next scan, i.e., 6T. This relation applies at normal velocities, the pilot frequency f becoming proportional to the velocity according to $$v \cdot 6T = a$$

$$v = \frac{a}{6T} = \frac{a}{6} \cdot \frac{f}{n}$$

where n is an integer = the division factor from f to the pulse frequency of B in FIG. 24.

Figure 25:
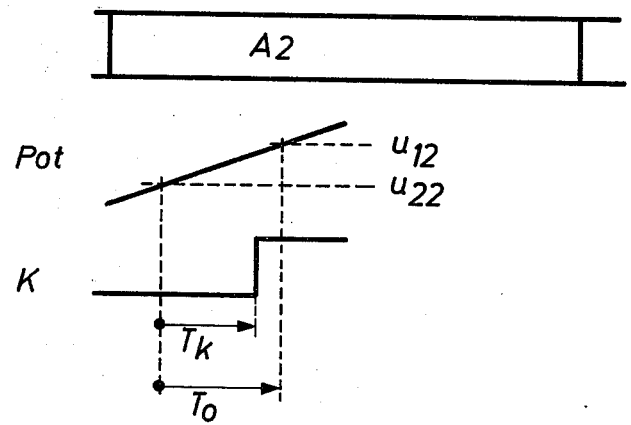
FIG. 25 shows a detail of the pulse diagram in FIG. 24.

The units X, Y, $I_1$, and U/K are thus superfluous at ordinary velocities. At very low velocities, approaching zero, the possibility of letting f be proportional to the velocity is somewhat limited as a very low pilot frequency for the system implies slow reactivity, owing to the low sampling rate. A lower limit $f_{min}$ for f is therefore introduced. When the velocity falls below and value corresponding to the frequency $f_{min}$ the position of the step K will indicate the velocity. The symbol $K^*$ is here introduced for the relation $T_k/T_0$ in which $T_k$ and $T_0$ are defined according to FIG. 25. We then have the following relation between v, T and $K^*$:

$$v = \frac{a}{T} \cdot \frac{K^*}{5+K^*} = a \cdot \frac{f}{n} \cdot \frac{K^*}{5+K^*}$$

This relation may be applied even at zero velocity when $K^*=0$ and at moderate negative velocities when $K^*$ is negative.

Approximating $5+K^* \approx 6$ it is easy to produce a pulse sequence with an average number of pulses/unit time that is proportional to the velocity, utilizing the signal K and a fixed pulse with a step at the point of time when the potentiometer arm passes the point at which the negative input terminal of $F_F$ is connected ($U_{22}$).

A prerequisite to good functioning in the formation of K is that the signal in the space between two adjacent sensor elements can be approximated by means of a straight line. This implies that the spatial frequency spectrum of the signal mainly lies below frequencies corresponding to the wavelength 2a. The accuracy of velocity measurement involving $K^*$ will be limited by linearity deviations of the spatial signal. Within the velocity range where $K^*=1$ and f follows the velocity there is no such limitation of the accuracy. Summing up the function of the circuitry according to FIG. 23: At ordinary velocities the circuitry controls the frequency f, making $K^*=1$ and making f proportional to the velocity. There are, in priciple, no limitations of the accuracy. It would be equally possible to carry out the measurements, using only two sensor elements. By the increased number of such elements it is, however, possible to achieve an improvement in the effective signal-to-noise ratio.

At velocities below a certain velocity the pilot frequency stops at a minimum value $f_{min}$, letting $K^*$ follow the velocity down to and below zero. $K^*$ is approximately proportional to the velocity.

I claim:

1. A method for measuring the velocity of an object relative to a reference surface by means of spaced receivers on the object, said receivers being positioned one after the other in the direction of the velocity component to be measured, comprising:

transmitting a signal to the reference surface which reflects the transmitted signal, the reflected signal being a spatial waveform function originating from the reflecting surface and which is defined by the nature of the surface of the reference;

receiving the reflected signals by said receivers and developing output signals in each receiver, the values of said output signals being a function of the position of the detecting area of the receiver relative to the reference surface;

sequentially sampling said receiver output signals at different scanning occasions;

storing the sampled values of the receiver output signal from a number of detecting areas at various positions relative to the object at a first scanning occasion, said stored sampled output signal values representing a sampled virtual image of the spatial waveform function;

interpolating the stored signal values by interpolation between said sample values of said sampled virtual image representing signal values at the first scanning occasion, to thereby develop an approximation of the spacial waveform function;

comparing values of the developed approximation of the spatial waveform function with corresponding values of a developed approximation of the spatial waveform function obtained at a later scanning occasion and generating a difference output which is the result of said comparing; and determining the displacement of the developed spatial waveform function relative to the object between said first and later scanning occasions, and generating a velocity signal that is a function of the quotient between said difference output and said approximation of the spatial waveform function and of the time elapsing between said first scanning occasion and said later scanning occasion, said velocity signal representing the velocity of the object relative to the reference surface.

2. The method according to claim 1 wherein said signal values obtained from said sampling at said first scanning occasion are stored simultaneously with each other.

3. A method for measuring the velocity of an object relative to a reference surface by means of spaced receivers on the object, said receivers being positioned one after the other in the direction of the velocity component to be measured, comprising:

transmitting a signal to the reference surface which reflects the transmitted signal, the reflected signal being a spatial waveform function originating from the reflecting surface and which is defined by the nature of the surface of the reference;

receiving the reflected signals by said receivers and developing output signals in each receiver, the values of said output signals being a function of the position of the detecting area of the receiver relative to the reference surface;

sequentially sampling said receiver output signals at different scanning occasions;

storing the sampled values of the receiver output signal from a number of detecting areas at various positions relative to the object at a first scanning occasion, said stored sampled output signal values representing a sampled virtual image of the spatial waveform function;

interpolating the stored signal values by interpolation between said sample values of said sampled virtual image representing signal values obtained at a later scanning occasion, to thereby develop an approximation of the spatial waveform function;

comparing the values of the developed approximation of the spatial waveform function with corresponding signal values stored at the first scanning occasion and generating a difference output which is the result of said comparing; and determining the displacement of the developed spatial function relative to the object between said first and later scanning occasions and generating a velocity signal that is a function of the quotient between the determined displacement of the developed spatial waveform function and the time elapsing between said first scanning occasion and said later scanning occasion, said velocity signal representing the velocity of the object relative to the reference surface.

4. The method according to claim 3 wherein said signal values obtained from said scanning at said first scanning occasion are stored cyclically relative to each other.

5. Apparatus for measuring the velocity of an object relative to a reference surface comprising:

means for transmitting a signal to the reference surface which reflects the transmitted signal, the reflected signal being a spatial waveform function originating from the reflecting surface and which is defined by the nature of the surface of the reference;

signal receivers on said object for developing a signal having a signal value that is a function of the position of a detecting area of the respective receiver relative to the reference surface, said signal receivers being positioned one after the other in the direction of the velocity component to be measured;

means coupled to said receivers for sequentially sampling the receiver output at different scanning occasions;

storing means coupled to said sampling means for storing said signal values from a number of detecting areas at various positions relative to the object at a first scanning occasion, said stored signal values representing a sampled virtual image of the spatial waveform function;

interpolation means coupled to said storing means for carrying out interpolation between said sample values for developing an approximation of the spatial waveform function;

comparing means coupled to said storing means for comparing the values of the developed approximation of the spatial waveform function with the corresponding signal values of a developed approximation of the spatial waveform function as obtained at a later scanning occasion, and for generating a difference output; and velocity determining means coupled to said comparing means and to said interpolation means for determining the displacement of the developed spatial waveform function relative to said object between said first and later scanning occasions and for generating a velocity signal that is a function of the quotient between the outputs of said comparing and interpolation means and of the time elapsing between said first scanning occasion and said later scanning occasion, said velocity signal representing the velocity of the object relative to the reference surface.

6. Apparatus according to claim 5, wherein:

at least two detecting areas are arranged with fixed positions relative to said object and at a fixed distance from each other;

said interpolation means comprises means for forming a first difference signal from signal values originating from two detecting areas at one scanning occasion, said first difference signal being a function of the spatial differential of the signal between the positions of the two detecting areas relative to said reference surface;

the signal value corresponding to one of the detecting areas being stored in said storing means at the first scanning occasion;

said comparing means comprises means for forming a second difference signal from the stored signal value and another signal value from the same detecting area at the second scanning occasion; and said velocity determining means comprises means for calculating the displacement of the object relative to the reference surface between the two scanning occasions, said generated velocity signal being a function of said displacement and of the time elapsing between the two scanning occasions.

7. Apparatus according to claim 6, wherein said receivers comprise developing means for developing signals corresponding to overlapping adjacent detecting areas.

8. Apparatus according to claim 6, wherein said receivers comprise signal developing means for developing signals corresponding to spaced apart detecting areas, said detecting areas being arranged such that the frequency spectrum of the spatial waveform function contains mainly spatial frequencies of a wavelength that is greater that the distance between the positions of adjacent detecting areas.

9. Apparatus according to claim 5 comprising means coupling said sampling means to said storing means for intermittently coupling a signal values developed from said movable detecting area to sequentially store signals in said storing means.

10. Apparatus according to claim 9 wherein said receivers include switching means for switching the receiver over from one to another of a number of detecting areas with fixed positions relative to said object for generating a movable detecting area.

11. Apparatus according to claim 10 wherein said receivers comprise signal developing means for developing signals corresponding to spaced apart detecting areas, said detecting areas being arranged such that the frequency spectrum of the spatial waveform function contains mainly spatial frequencies of a wavelength that is greater than the distance between the positions of adjacent detecting areas.

12. Apparatus according to claim 5 wherein said receivers comprise signal developing means for developing signals corresponding to overlapping adjacent detecting areas.

13. Apparatus for measuring the velocity of an object relative to a reference surface comprising:

means for transmitting a signal to the reference surface which reflects the transmitted signal, the reflected signal being a spatial waveform function originating from the reflecting surface and which is defined by the nature of the surface of the reference;

signal receivers on said object for developing a signal having a signal value that is a function of the position of a detecting area of the respective receiver relative to the reference surface, said signal receivers being positioned one after the other in the direction of the velocity component to be measured;

means coupled to said receivers for sequentially sampling the receiver output at different scanning occasions;

storing means coupled to said receivers for storing said signal values from a number of detecting areas at various positions relative to the object at a first scanning occasion, said stored signal values representing a sampled virtual image of the spatial waveform function;

interpolation means coupled to said storing means for carrying out interpolation between said sample values representing signal values obtained at a later scanning occasion for developing an approximation of the spatial waveform function;

comparing means coupled to said interpolation means and to said storing means for comparing the values of the developed approximation of the spatial waveform function with the corresponding signal values of a developed approximation of the spatial waveform function as obtained at the first scanning occasion, and for generating a difference output; and velocity determining means coupled to said storing means and to said interpolation means for determining the displacement of the developed spatial waveform function relative to said object between said first and later scanning occasions and for generating a velocity signal that is a quotient between the determined displacement of the developed spatial waveform function and the time elapsing between said first scanning occasion and said later scanning occasion, said velocity signal representing the velocity of the object relative to the reference surface.

14. Apparatus according to claim 13, wherein:

at least two detecting areas are arranged with fixed positions relative to said object and at a fixed distance from each other;

said comparing means includes a first comparator for forming a first difference signal from signal values originating from two detecting areas at one scanning occasion, said first difference signal being a function of the spatial differential of the signal between the positions of the two detecting areas relative to said reference surface;

a second comparator is provided for forming a second difference signal from the stored signal value and another signal value from the same detecting area at the second scanning occasion; and said velocity determining means comprises means responsive to said first and second difference signals for calculating the displacement of the object relative to the reference surface between the two scanning occasions, and said generated velocity signal being a function of said displacement and of the time elapsing between the two scanning occasions.

15. Apparatus according to claim 14, wherein said receivers comprise signal developing means for developing signals corresponding to spaced apart detecting areas, said detecting areas being arranged such that the frequency spectrum of the spatial waveform function contains mainly spatial frequencies of a wavelength that is greater than the distance between the positions of adjacent detecting areas.

16. Apparatus according to claim 13 comprising means coupling said sampling means to said storing means for intermittently coupling said signal values developed from a movable detecting area to sequentially store signals in said storing means.

17. Apparatus according to claim 13 wherein said receivers include switching means for switching the receiver over from one to another of a number of detecting areas with fixed positions relative to said object for generating a movable detecting area.

18. Apparatus according to claim 17 wherein said receivers comprise signal developing means for developing signals corresponding to overlapping adjacent detecting areas.

19. Apparatus according to claim 17 wherein said receivers comprise signal developing means for developing signals corresponding to spaced apart detecting areas, said detecting areas being arranged such that the frequency spectrum of the spatial waveform function contains mainly spatial frequencies of a wavelength that is greater than the distance between the positions of adjacent detecting areas.

* * * * *